(No Model.)

J. E. PORTER.
SINGLE TREE SLING.

No. 256,734. Patented Apr. 18, 1882.

Witnesses,
Edwin L. Yewell
J. J. McCarthy.

Inventor,
J. E. Porter
By C. M. Alexander
his Attorney.

UNITED STATES PATENT OFFICE.

JOSEPH E. PORTER, OF OTTAWA, ILLINOIS.

SINGLE-TREE SLING.

SPECIFICATION forming part of Letters Patent No. 256,734, dated April 18, 1882.

Application filed February 21, 1882. (No model.)

*To all whom it may concern:*

Be it known that I, JOSEPH E. PORTER, of Ottawa, in the county of La Salle, and in the State of Illinois, have invented certain new and useful Improvements in Single-Tree Slings; and I do hereby declare that the following is a full, clear, and exact description thereof, reference being had to the accompanying drawings, and to the letters of reference marked thereon, making a part of this specification.

This invention has for its objects to provide certain means for carrying the rope to and from the barn while elevating hay, and preventing the single-tree from knocking against the horse's heels by holding up against his hips, as more fully hereinafter specified. These objects I attain by the means illustrated in the accompanying drawings, in which—

Figure 1:
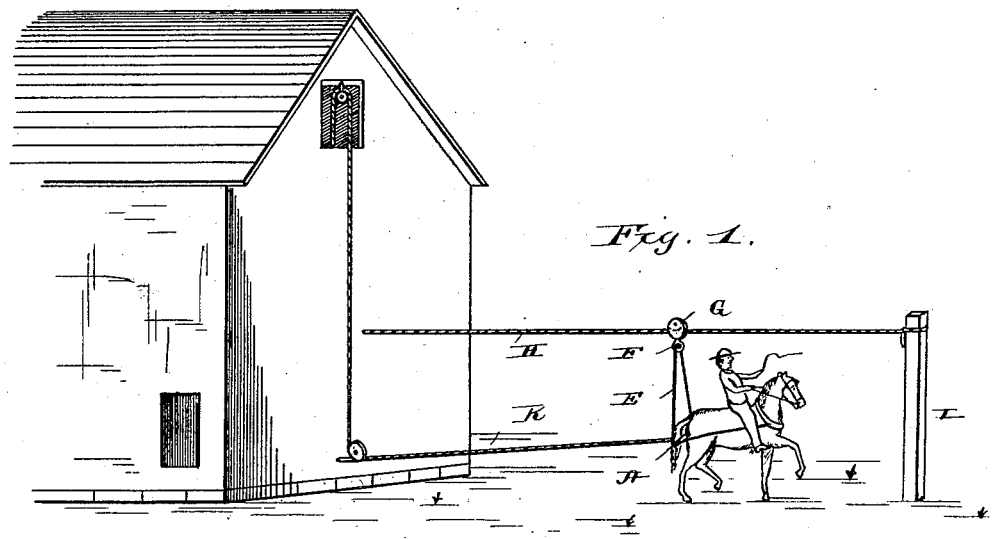
Figure 2:
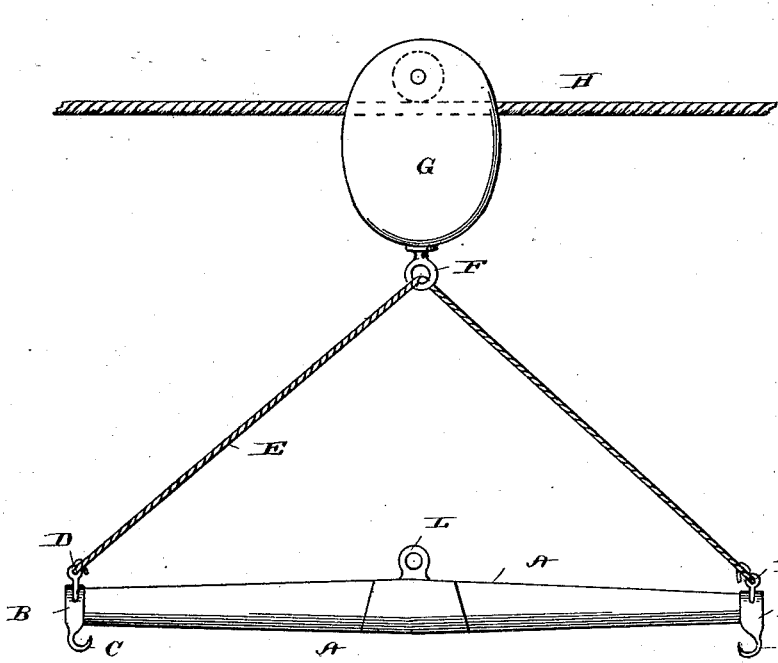

Figure 1 represents a view of my improved single-tree and its attachments, and Fig. 2 a view illustrating the method of its application.

The letter A indicates the single-tree, which is of the ordinary or any approved construction, and is provided at its ends with attachments B, having hooks C, by means of which it can be secured to the traces of a horse or other draft-animal, and with eyes D, to which a rope or chain, E, may be attached or looped around the end of the single-tree, and passing through the eye F of a sheave, G, which may be rigidly attached or swiveled.

The sheave is provided with a grooved pulley, which is adapted to travel along a rope or wire, H, stretched between the barn and a suitable standard or support, I, as indicated in Fig. 1 of the drawings.

The operation of my invention will be readily understood in connection with the above description, and is as follows: The rope or chain K of the hay-elevator is attached to the eye L of the single-tree, as usual. The traces of the horse or other draft-animal are secured to the hooks C, and the sheave and its pulley, properly attached to the single-tree by means of the rope, wire, or chain E, are properly arranged to travel upon the rope or wire H, so as to support or suspend the single-tree against the hips of the horse, as illustrated in Fig. 1 of the drawings.

Having thus described my invention, what I claim, and desire to secure by Letters Patent, is—

The combination, with the single-tree A, of the attachment B, provided with hooks C and eyes D, and the rope, wire, or chain E, and pulley-sheave G, adapted to travel upon a suitable rope, wire, or chain and support the single-tree parallel with the line of draft, substantially as and for the purposes specified.

In testimony whereof I affix my signature, in presence of two witnesses, this 6th day of February, 1882.

JOSEPH E. PORTER.

Witnesses:
J. A. HOSSACK,
F. M. YENTZER.